(12) United States Patent
Daly

(10) Patent No.: US 8,043,417 B2
(45) Date of Patent: Oct. 25, 2011

(54) COLUMN INSTALLED CONDENSER

(75) Inventor: Phillip F. Daly, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 353 days.

(21) Appl. No.: 12/486,283

(22) Filed: Jun. 17, 2009

(65) Prior Publication Data

US 2009/0321057 A1    Dec. 31, 2009

Related U.S. Application Data

(60) Provisional application No. 61/077,000, filed on Jun. 30, 2008.

(51) Int. Cl.
*B01D 53/00* (2006.01)
(52) U.S. Cl. .......... 95/288; 62/615; 62/640; 165/165
(58) Field of Classification Search ............ 95/288; 62/615, 640; 165/165
See application file for complete search history.

(56) References Cited

U.S. PATENT DOCUMENTS

| | | | |
|---|---|---|---|
| 2,044,372 A | 6/1936 | Twomey | |
| 4,089,370 A | 5/1978 | Marchal et al. | |
| 4,218,289 A | 8/1980 | Hajek et al. | |
| 5,507,356 A | 4/1996 | Roth et al. | |
| 5,864,112 A | 1/1999 | Blomgren et al. | |
| 5,893,408 A * | 4/1999 | Stark ............................. | 165/66 |
| 5,950,715 A | 9/1999 | Jonsson et al. | |
| 6,179,051 B1 | 1/2001 | Ayub | |
| 6,289,977 B1 | 9/2001 | Claudel et al. | |
| 6,516,874 B2 | 2/2003 | Mathur et al. | |
| 6,918,433 B2 | 7/2005 | Kontu | |
| 7,044,207 B1 | 5/2006 | Guidat et al. | |
| 7,204,300 B2 | 4/2007 | Kontu et al. | |
| 7,347,253 B2 | 3/2008 | Tauren et al. | |

FOREIGN PATENT DOCUMENTS

DE    198 30 163 A1    1/2001

OTHER PUBLICATIONS

Li et al., Research of Automatic Orientation Fast Clamping Tool in Plate Welding, Petrochemical Equipment 33(5) 2004 p. 45-46, Lanzhou Petroleum Machinery Research Inst.
Gardner G., "King of the Castle"; The First Compact Gasket-Free, All welded plate heat exchanger The Chemical Engineer, (Aug. 11, 1994) Inst. of Chemical Engineers.
"New Products: Hybrid Heat Exchangers", Petroleum Technology Quarterly 6(3) 2001 p. 167.
Kobalenko, L.M., New Welded-Plate Heat Eschanger, Khim Neft Mashinostr 1972 N.3 1-2 Chem Abstract V76-142742.

(Continued)

*Primary Examiner* — Robert A Hopkins
(74) *Attorney, Agent, or Firm* — David J Piasecki

(57) ABSTRACT

A reactor-installed or column-installed vertical plate heat exchanger having channels for flow of cooling fluid and vertical passageways between the cooling fluid channels for flow of product. A divider is located between a first fraction and a second fraction of the product vertical passageways and a vapor product inlet communicates with the tops of the product vertical passageways in the first fraction. A product collection volume communicates with the bottoms of the product vertical passageways and an outlet communicates with the product collection volume for recovering condensed product. An uncondensed vapor outlet communicates with the tops of the vertical passageways in the second fraction for removing uncondensed vapor from the heat exchanger.

20 Claims, 4 Drawing Sheets

OTHER PUBLICATIONS

Xy, Y. "Large Area Welded Plate-Shell Type Heat Exchanger", Petroleum Refining and Petrochemistry, V29 N.2 p. 35-38 (Feb. 25, 1999) English Abstract.

Isomura, T. Sp[ecial Mini-Issue/Special Heat Exchangers for Petroleum and Refining and Petrochemistry, Petrotech V15 N. 7 p. 625-26 (Jul. 1992) Maruzen.

Reppich, M. "Module Welded Plate Heat Exchangers with High Performance . . . "GVC Annual Meeting, Freiburg, Germany 1998, Paper N. 189 V70 N. 9 p. 1203-4 (in German).

Waintraub, L. "Compact Design Improves Efficiency and CAPEX" GPA 77th Annual Convention (Dallas 1998) Proceedings p. 180-84 (1998).

* cited by examiner

COLUMN INSTALLED CONDENSER

CROSS-REFERENCE TO RELATED APPLICATION

This application claims priority to Provisional U.S. Application No. 61/077,000, filed Jun. 30, 2008, all of which is incorporated by reference.

FIELD OF THE INVENTION

This invention relates to heat exchangers installed within other vessels. In particular, the invention relates to plate-type heat exchangers, and more particularly to such an exchanger installed as a condenser in a reactor or a separation or fractionation column.

DESCRIPTION OF RELATED ART

Many industries such as petrochemical, chemical and petroleum refining use columns for separating mixtures. Such columns are typically cylindrical, vertically orientated vessels wherein rising vapor and descending liquid come into contact, transfer components, separate, and pass respectively towards the top and bottom sections of the column. Frequently, columns contain vapor-liquid contacting devices to enhance the contacting and separation of the vapor and liquid phases. Examples of vapor-liquid contacting devices include trays and packings. Many of these vapor/liquid contacting devices have a wide variety of designs. For example, tray types of vapor/liquid contacting devices include bubble cap, sieve, valve, and multiple downcomer trays which typically allow liquid to descend and vapor to ascend through the tray. Packings include random packings, filled with Raschig rings or Berl saddles for example, and structured packings.

The specific operating conditions of individual columns may vary significantly in order to accomplish the myriad separations for the vastly different mixtures that are processed. Examples of processes that use such columns include stripping, rectification, and various forms of distillation such as fractional distillation, steam distillation, reactive distillation, and distillation in divided wall columns. These processes may be operated in either batch or continuous modes. Reducing the installed and operating costs of the column are common objectives of the design and operation. In many cases, this effort focuses on the equipment and utilities required for the supply and removal of heat from the column.

Similarly, a vessel in which a reaction is carried out also may have need for a heat exchanger. For example, a heat exchanger in the vapor space above a reaction might be useful for condensing evaporated reactants while allowing removal of uncondensed vapors, particularly product vapors.

Commonly, heat is supplied or removed from a column by removing a stream from the column, passing it through a heat exchanger external to the column shell, and returning at least part of the stream thus cooled or heated to the column. For example, overhead vapor may be withdrawn from the top section of the column and passed to an overhead system outside the column shell that comprises a heat exchanger which condenses liquid from the overhead vapor and a means for returning at least a portion of the condensed liquid to the column to provide reflux. The overhead system frequently also comprises a receiver to separate the condensed liquid from uncondensed vapor, a pump to transfer the liquid from the receiver to the column, pipes, and valves. Such heat exchangers are commonly referred to as condensers or partial condensers. In an analogous manner, heat exchangers are commonly used to provide vapor to the column by heating a liquid stream removed from the bottom section of the column. Vapor and liquid streams may be withdrawn from the central section between the top and bottom sections of the column, heated or cooled and returned to the column.

Multiple heat exchangers are used to exchange heat in a step-wise manner. For example, heat is recovered from a vapor phase in a first heat exchanger for use elsewhere, such as to generate steam followed by a second heat exchanger to further cool the remaining vapor phase to meet a temperature requirement, such as for storage. Additional examples are illustrated and discussed in E. Kirschbaum, Distillation and Rectification, 82-85 (Chemical Publishing Co. 1948). This text shows a first heat exchanger located inside the top section of a shell and a second heat exchanger located external to the shell of a still in FIG. 49 on page 80 and of a packed column in FIG. 197 on page 310.

U.S. Pat. Nos. 2,044,372; 4,218,289; and 5,507,356; and DE 198 30 163 A1 all describe the use of various heat exchangers inside columns to at least partially condense vapor in the top section of columns.

U.S. Pat. No. 2,044,372 also describes the use of a vertical submerged condenser between a low pressure section and a high pressure section of a single column.

U.S. Pat. No. 5,507,356 also describes the use of a plate heat exchanger operated as a condenser installed between two packed beds or trays within the column situated within a collecting vessel open at the top.

Various benefits can be obtained by using heat exchangers inside columns compared to locating them outside the column shell. For example, some equipment of the overhead system and associated supporting structure can be eliminated when the condenser is located inside the column. This provides savings in terms of both cost and space. Also, the pressure drop through such an internal heat exchanger can be lower than that of the equivalent external overhead system. The lower pressure drop is an especially important factor when the column is operated at subatmospheric pressure such as when the mixture being processed in the column is heat sensitive.

Welded plate heat exchangers are used in columns as a condenser. However, the vertical space taken by such exchangers is significant. Therefore, there exists a need for a compact heat exchanger that can be effective, efficient, and economically installed in a reactor or column vessel.

SUMMARY OF THE INVENTION

In a first embodiment, the invention is directed to a heat exchanger installed in a reactor or a separation or fractionation column.

A second embodiment of the invention is directed to a vertical plate heat exchanger installed in a reactor or a separation or fractionation column as a condenser.

A third embodiment of the invention is directed to a vertical plate heat exchanger installed in a reactor or a separation or fractionation column as a condenser wherein a divider forms two separate fractions for product flow.

Still another embodiment of the invention is directed to a vertical plate heat exchanger installed in a reactor or a separation or fractionation column as a condenser wherein a divider forms two separate fractions for product flow in which the direction of product flow is reversed between fractions.

Yet another embodiment of the invention is directed to a vertical plate heat exchanger installed in a reactor or a separation or fractionation column as a condenser wherein a divider forms two separate fractions for product flow in which the direction of product flow is reversed between fractions, and a second divider to form separate fractions for cooling fluid channels corresponding to the product flow fractions.

Another embodiment of the invention is directed to a method for operating a vertical plate heat exchanger installed in a reactor or a separation or fractionation column as a condenser.

DETAILED DESCRIPTION

Vertical plate heat exchangers are used in reactor vessels and in separation or fractionation columns to withdraw heat from the materials flowing therein. Typically, a liquid condensate stream is recovered and a stream of non-condensable materials, that is, compounds that do not condense at the conditions of operation of the heat exchanger, are separately recovered. Such heat exchangers are known to the skilled practitioner.

For simplicity and ease of description, embodiments of the invention will be described with particularity as they relate to separation or fractionation columns, or, simply, columns. However, many of these embodiments will be readily applicable to reactor vessels and other vessels from which heat is to be removed.

Further, as used herein, the word "product" in relation to a stream does not indicate that the stream is a desired product or a material sought to be recovered from the process. Similarly, non-condensables, as that word is defined above, and uncondensed vapor are not to be considered by-products or compositions that are not preferred or to be recovered. For example, a non-condensable stream may be the preferred product of the process.

Figure 1:
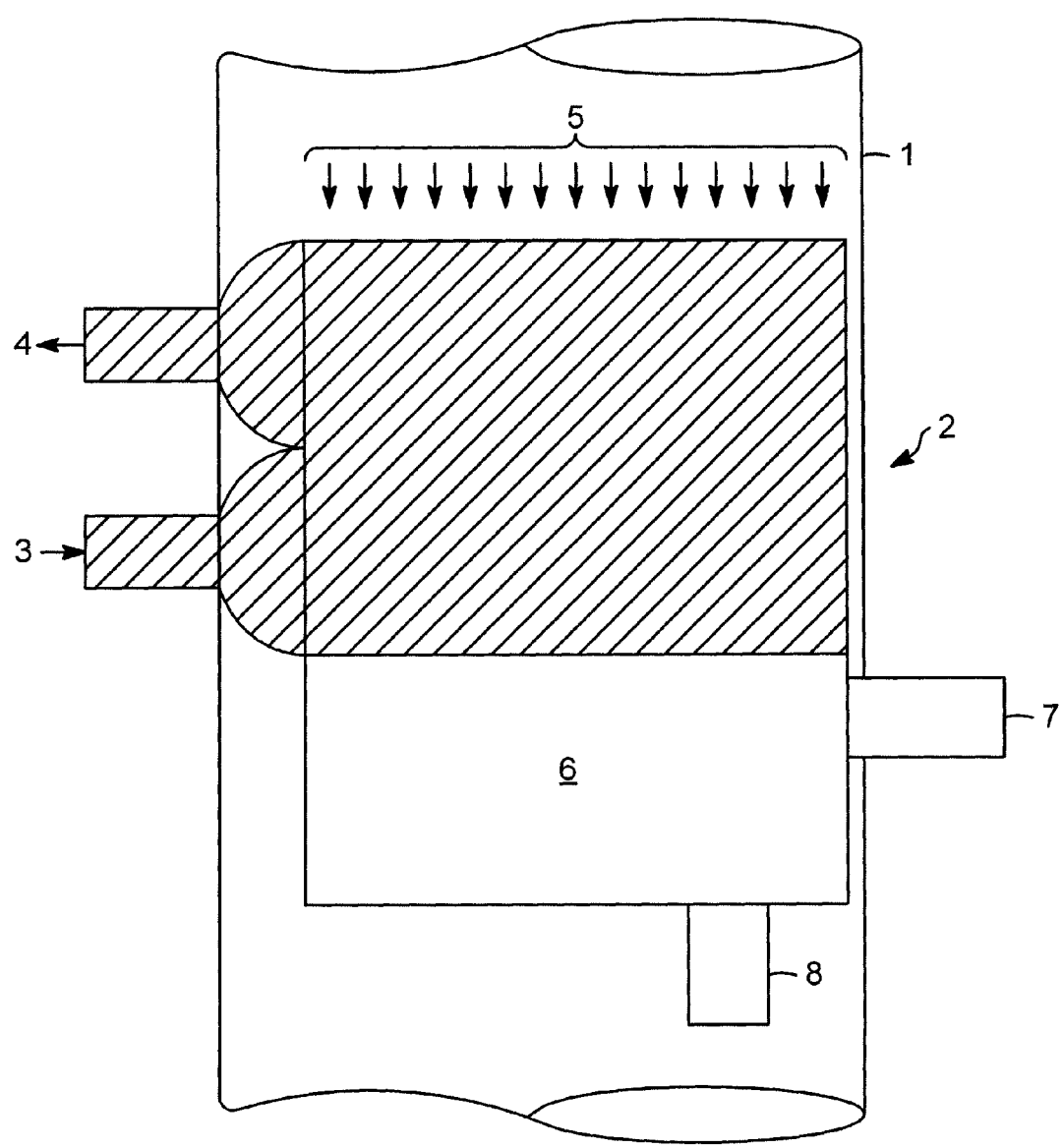
FIG. 1 illustrates a front schematic view of a prior art vertical plate heat exchanger installed in a reactor or separation or fractionation column as a condenser.

Installation of a vertical plate heat exchanger in a column is illustrated in a front view of a prior art installation in FIG. 1. The heat exchanger 2 is shown installed in column 1. The details of how heat exchanger 2 is installed in column 1 are known to the skilled practitioner and therefore are not illustrated in FIG. 1. Heat exchanger 2 may comport to the shape of the column, but typically is installed to direct product flow, whether vapor or liquid, using baffles, ducts, and other devices not shown in the schematic. These additional flow diversion devices are known to the skilled practitioner and so are not illustrated.

As shown in FIG. 1, prior art heat exchanger 2 has coolant flow inlet 3 and outlet 4 for cooling fluid. For convenience, the figures will be described for counter-current flow of product and coolant. The coolant flow also could be reversed, depending upon the availability of coolant at suitable temperatures and the operating preference of the owner. Coolant flow may also be arranged as horizontal cross-flow in one or more cross-passes where these cross passes may be arranged in counter-current flow with the product or reversed.

Cooling fluid flows in vertical plate assemblies that form cooling fluid channels and product flow spaces or passageways. Product vapor is passed downwardly, as shown by flow direction arrows 5 in FIG. 1, through the product flow spaces and at least partially condenses, forming a mixture of liquid and vapor that is collected in a product collection volume, liquid-vapor disengagement space 6. Vaporous product and non-condensables are removed from the disengagement space 6 through duct 7. Condensed (liquid) product is removed by way of conduit 8.

Figure 2:
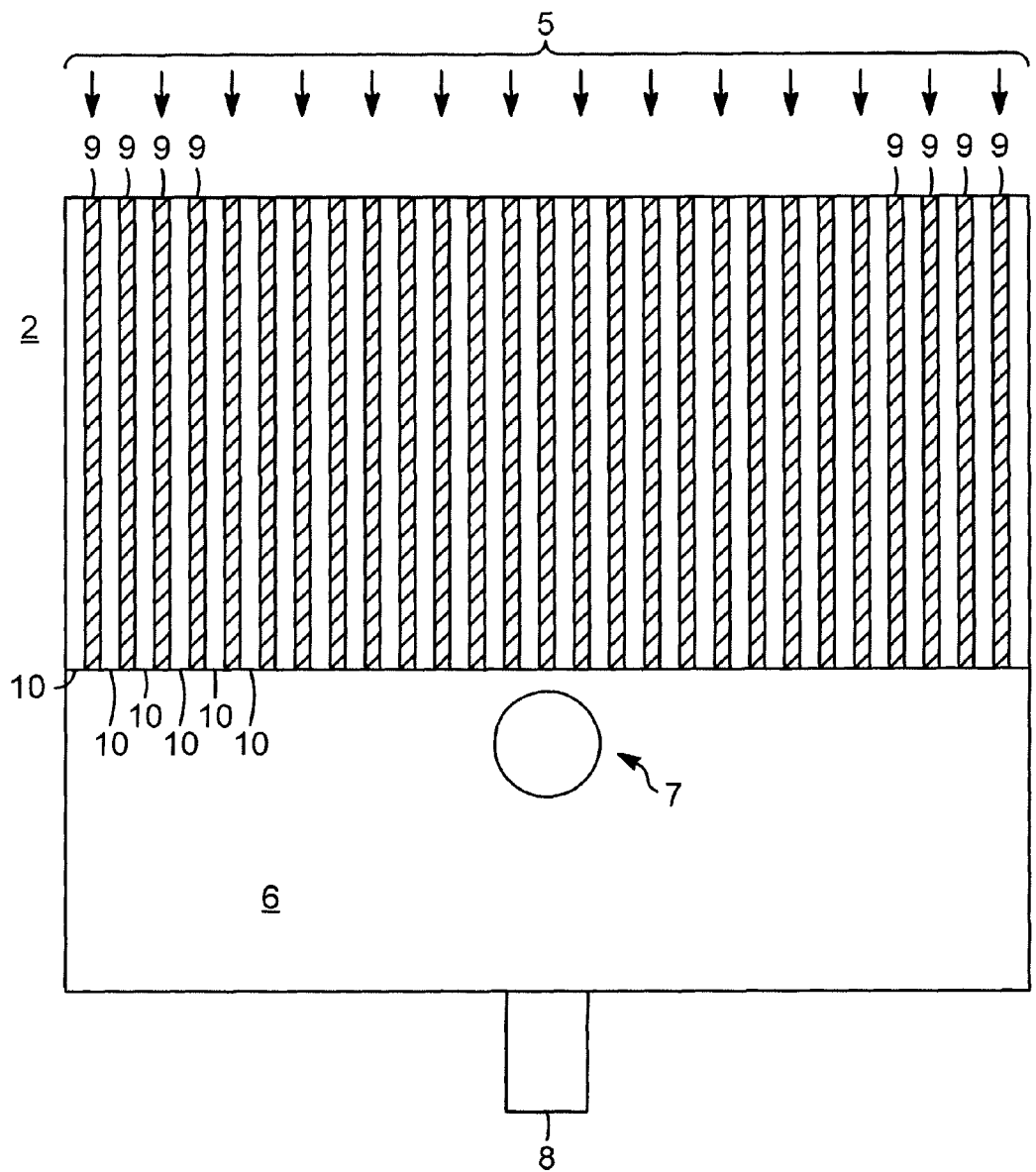
FIG. 2 illustrates a side schematic view of the interior and arrangement of a prior art vertical plate heat exchanger.

FIG. 2 is a side schematic view of a prior art heat exchanger 2 without the column 1. FIG. 2 illustrates the arrangement of coolant flow plate assemblies 9. Each assembly comprises two plates spaced apart from each other by a gap, also called a plate or channel gap, and welded or otherwise sealed to form a coolant flow path for introduction of cooling fluid. Product vapor is passed downwardly, as illustrated by flow direction arrows 5, through vertical product flow spaces or passageways 10 or gaps, also called passageway gaps, between the plate assemblies. Product at least partially condenses and flows downwardly into liquid-vapor disengagement space 6. Vaporous product and non-condensables are removed from the disengagement space 6 through duct 7. Condensed (liquid) product is removed by way of conduit 8.

In these prior heat exchangers, the liquid-vapor disengagement space 6 must have sufficient volume to provide disengagement between the liquid product and the vaporous product and non-condensables. The required vertical height of liquid-vapor disengagement space 6 is costly, not only because it makes the heat exchanger large, but also because it increases the height of the vessel or column in which it is installed. Because additional column length increases column cost, there exists a need to reduce the height of the heat exchangers. The use of two separate coolant streams may also allow two separate column installed condenser services, (for example, a primary condenser and a vent condenser), potentially installed vertically in series in the same column, to be combined in one location, reducing the total column height required for the heat exchangers.

Figure 3:
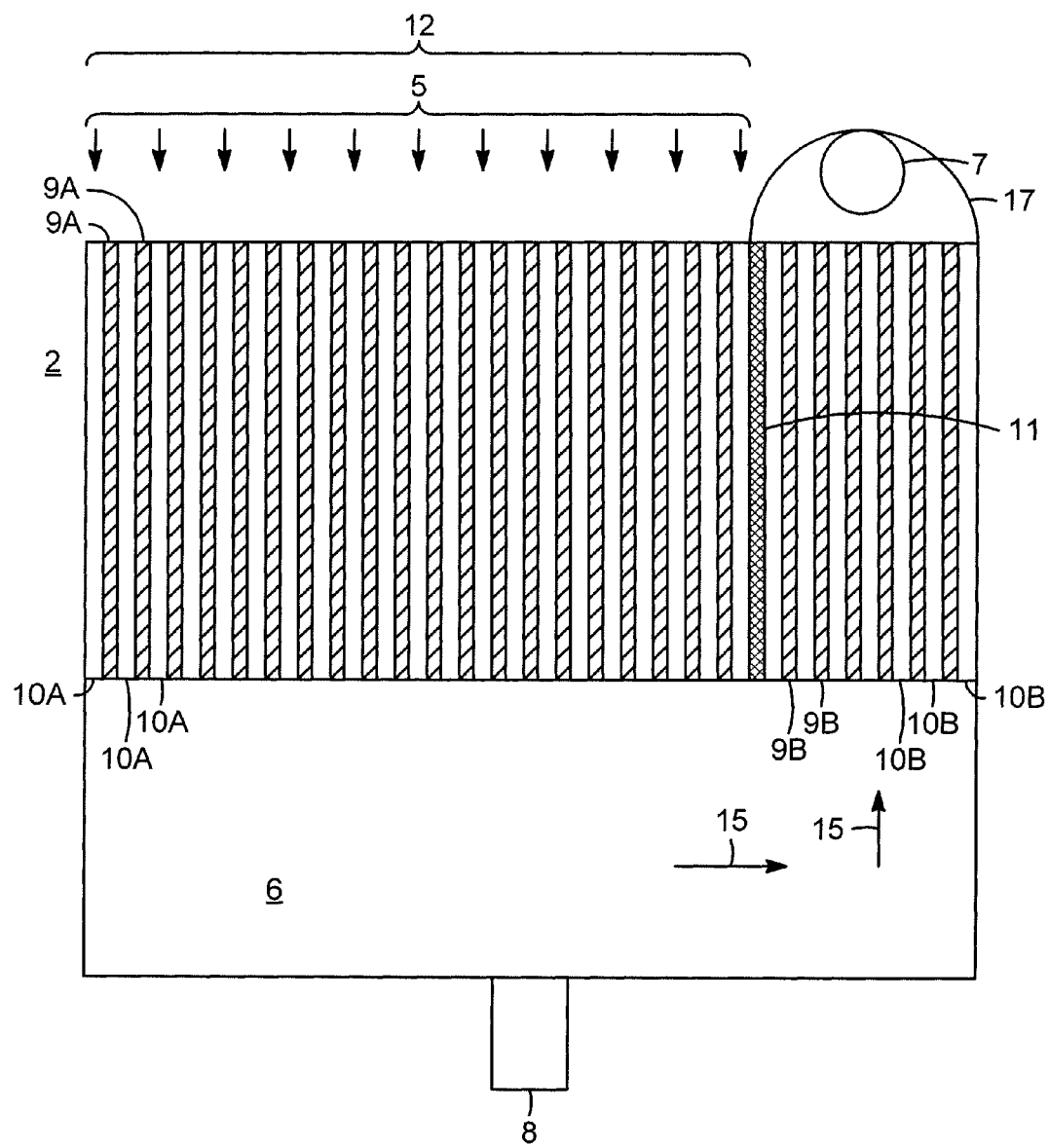
FIG. 3 illustrates a side schematic view of the interior and arrangement illustrating embodiments of a vertical plate heat exchanger having a first divider forming two separate fractions for product flow.

A side schematic view of an embodiment of a heat exchanger of the invention is set forth in FIG. 3. Coolant flows from coolant flow inlet 3 (not shown in this Figure) through channels formed in coolant flow plate assemblies 9 to coolant flow outlet 4 (not shown in this Figure). Vertical product flow spaces or passageways 10 are vertical passageways between adjacent coolant flow plate assemblies 9. A divider 11 is disposed between adjacent coolant flow plate assemblies 9 to form a first fraction of product flow passageways 10A and a second fraction of product flow passageways 10B.

Product vapor flows downwardly, as indicated by flow direction arrow 5, from vapor product inlet 12 formed in the column above the heat exchanger. Product vapor flows into product flow passageways 10A and is at least partially condensed therein. Liquid and vaporous product and non-condensables flow out the bottoms of product flow passageways 10A and into a product collection volume, liquid-vapor disengagement space 6.

Vapor and liquid are inefficiently disengaged in the product collection volume, liquid-vapor disengagement space 6 because the vertical height and volume thereof is insufficient to afford good separation of liquid and vapor. In embodiments of the invention, additional liquid/vapor disengagement is carried out in the second fraction of product flow passageways 10B. Vaporous product and non-condensables flow in the direction of flow direction arrows 15 upwardly through the second fraction of product flow passageways, i.e., in product flow passageways 10B. In this way, there is additional opportunity for condensation of product and disengagement of liquid from vaporous product and non-condensables. Thus, embodiments of the invention utilize the vertical height of the liquid-vapor disengagement space 6 and of vertical product flow passageways 10B for disengagement. These embodiments reduce the need for liquid-vapor disengagement space below the passageways and therefore reduce column height.

As noted above, when product vapors and non-condensables flow upwardly in product flow passageways 10B, additional product is separated. Liquid product then flows downwardly into the product collection volume. Liquid product then is separately recovered through conduit 8. Product that has not condensed and non-condensables are collected in manifold 17 and are removed from the reactor through duct 7, which serves as an outlet for uncondensed vapor, including non-condensables.

In other embodiments of the heat exchanger of the invention, the second fraction of the heat exchanger is different from the first fraction. In particular, the plate geometry and plate operating temperature are adjusted. In one such embodiment, the vertical passageways that serve as product flow passageways 10B (passageway gaps) are narrower or wider than product flow passageways 10A (passageway gaps). In another embodiment, the coolant flow plate assemblies 9B (channel gaps) are narrower or wider than coolant flow plate assemblies 9A (channel gaps). An embodiment changing both plate geometry and operating temperature also is contemplated.

Another embodiment of the heat exchanger of the invention is directed to operating the second, fraction of the heat exchanger, i.e., coolant flow plate assemblies 9B, at a temperature different from, and typically colder than, the temperature at which the coolant flow plate assemblies 9A are operated. This temperature difference can be maintained by using the same coolant or a different coolant at the different temperature. Apparatus to achieve this different coolant temperature is illustrated schematically in a top view in FIG. 4.

Figure 4:
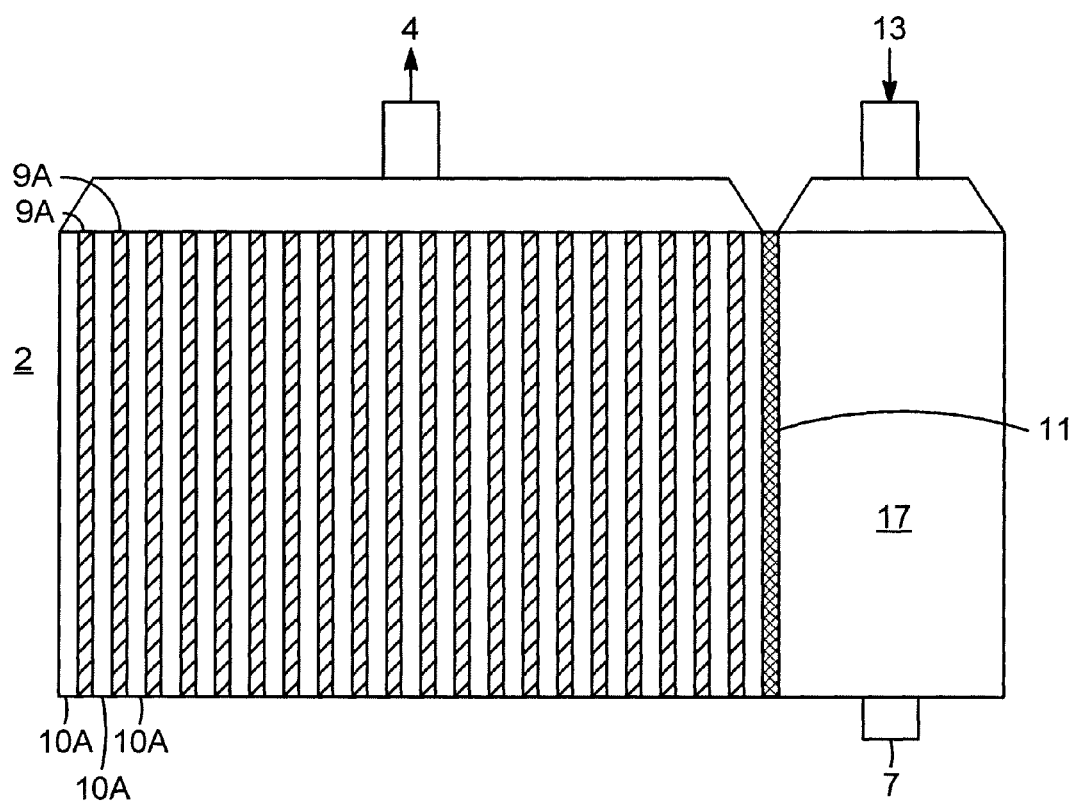
FIG. 4 illustrates a top schematic view of an embodiment of the invention wherein each separate flow fraction has a separate corresponding coolant source and outlet.

As shown in FIG. 4, heat exchanger 2 is divided at divider 11 into two separate fractions. A first fraction comprises coolant flow plate assemblies 9A and product flow passageways 10A in the form of vertical passageways. Product vapor enters the top of the heat exchanger and flows downwardly into liquid-vapor disengagement space 6 (not shown). Product vapor and non-condensables then flow upwardly through product flow passageways 10B (not shown). Any material that does not condense is collected in manifold 17 and removed from the heat exchanger through duct 7.

As also shown in FIG. 4, coolant is introduced to the first fraction of the heat exchanger through coolant flow inlet 3 (not shown). A separate coolant flow inlet 13 is associated with the second, product up-flow section of the heat exchanger. The coolant flow inlet 13 obscures coolant flow outlet 14, just as coolant flow outlet 4 obscures coolant flow inlet 3 in the figure. As the skilled practitioner recognizes, because embodiments of the invention are being described with countercurrent flow in the heat exchanger, the flow direction in the second, up-flow section of the heat exchanger has the colder inlet coolant flow at the top of coolant flow plate assemblies 9B, whereas the first section of the heat exchanger has the cooler inlet coolant flow at the bottom of the coolant flow plate assemblies 9A.

In an embodiment wherein the second fraction of the heat exchanger is operated with a lower coolant temperature than the first fraction of the heat exchanger, the second fraction may serve as a vent condenser if operated at temperatures that condense essentially all of the product stream and leaves essentially only non-condensables to be removed from the heat exchanger through manifold 17 and duct 7.

Many parameters of construction and operation can be adjusted within embodiments of the invention. For example, the relative proportion of the heat exchange area of the first section to that of the second can be adjusted. This proportion can be adjusted in several ways. For example, the plate or channel gaps 9A and 9B can be different, as can passageway gaps 10A and 10B. Alternatively, the location of the divider (changing the quantity of passageways and plate assemblies on each side of the divider) is a simple way to adjust the proportions of the fractions.

The relative temperatures of the two fractions also can be adjusted to accommodate a variety of modes of operation. Some or all of these adjustments can be made simultaneously.

These parameters are adjusted with basic considerations in mind. For example, in the second, up-flow section of the heat exchanger, the velocity of the product vapors and non-condensables should not exceed a velocity at which liquid product is entrained in and carried out with the non-condensables and uncondensed product. Further, the surface area of the coolant flow plate assemblies, in combination with the relative temperature of the coolant or coolants, must be sufficient to achieve the preferred degree of condensation.

Typically, the first fraction comprises at least about 50 percent of the available heat exchange area, more typically about 60 percent, and most typically about 75 percent. With the guidance provided herein, the skilled practitioner will be able to build and operate a heat exchanger within the scope of the invention.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A reactor-installed or column-installed vertical plate heat exchanger having a heat exchange area, the heat exchanger comprising:
   cooling fluid channels for flow of cooling fluid from a cooling fluid inlet to a cooling fluid outlet;
   product vertical passageways located between the cooling fluid channels for flow of product, the product vertical passageways having a top and a bottom;
   a divider located between a first fraction and a second fraction of the product vertical passageways;
   a vapor product inlet communicating with the tops of the product vertical passageways in the first fraction;
   a product collection volume communicating with the bottoms of the product vertical passageways for collecting condensed product and uncondensed vapor;
   a condensed product outlet communicating with the product collection volume for recovering condensed product; and
   an uncondensed vapor outlet communicating with the tops of the vertical passageways in the second fraction for removing uncondensed vapor from the exchanger.

2. The heat exchanger of claim 1, wherein the cooling fluid channels comprise a first fraction of the cooling fluid channels corresponding to the first fraction of the product vertical passageways and a second fraction of the cooling fluid channels corresponding to the second fraction of the product vertical passageways.

3. The heat exchanger of claim 2, further comprising separate cooling fluid inlets and outlets for the first and second fractions of the cooling fluid channels.

4. The heat exchanger of claim 1, wherein the product vertical passageways form passageway gaps and the passageway gaps in the second fraction of the product vertical passageways are different from the passageway gaps in the first fraction of the product vertical passageways.

5. The heat exchanger of claim 1, wherein the cooling fluid channels form channel gaps and channel gaps corresponding to the second fraction of the product vertical passageways are different from the channel gaps in the first fraction of the product vertical passageways.

6. The heat exchanger of claim 4, wherein the cooling fluid channels form channel gaps and channel gaps corresponding to the second fraction of the product vertical passageways are different from the channel gaps in the first fraction of the product vertical passageways.

7. The heat exchanger of claim 3, wherein the product vertical passageways form passageway gaps and the passageway gaps in the second fraction of the product vertical passageways are different from the passageway gaps in the first fraction of the product vertical passageways.

8. The heat exchanger of claim 3, wherein the cooling fluid channels form channel gaps and channel gaps corresponding to the second fraction of the product vertical passageways are different from the channel gaps in the first fraction of the product vertical passageways.

9. The heat exchanger of claim 7, wherein the cooling fluid channels form channel gaps and channel gaps corresponding to the second fraction of the product vertical passageways are different from the channel gaps in the first fraction of the product vertical passageways.

10. The heat exchanger of claim 1 wherein the first fraction of product vertical passageways comprises at least about 50 percent of the heat exchange area of the heat exchanger.

11. The heat exchanger of claim 10 wherein the first fraction of product vertical passageways comprises at least about 75 percent of the heat exchange area of the heat exchanger.

12. The heat exchanger of claim 2 wherein the first fraction of product vertical passageways comprises at least about 50 percent of the heat exchange area of the heat exchanger.

13. The heat exchanger of claim 12 wherein the first fraction of product vertical passageways comprises at least about 75 percent of the heat exchange area of the heat exchanger.

14. The heat exchanger of claim 3 wherein the first fraction of product vertical passageways comprises at least about 50 percent of the heat exchange area of the heat exchanger.

15. The heat exchanger of claim 14 wherein the first fraction of product vertical passageways comprises at least about 75 percent of the heat exchange area of the heat exchanger.

16. The heat exchanger of claim 4, wherein the first fraction of product vertical passageways comprises at least about 75 percent of the heat exchange area of the heat exchanger.

17. The heat exchanger of claim 6, wherein the first fraction of product vertical passageways comprises at least about 75 percent of the heat exchange area of the heat exchanger.

18. The heat exchanger of claim 9, wherein the first fraction of product vertical passageways comprises at least about 75 percent of the heat exchange area of the heat exchanger.

19. A method for operating a vertical plate heat exchanger in a reactor or a column, said method comprising:
    passing a product vapor downwardly through passageways in a first part of the heat exchanger;
    condensing at least part of the product vapor to form a vapor-liquid mixture;
    separating the vapor-liquid mixture to form a first vapor phase and a first liquid phase;
    passing the first vapor phase upwardly through passageways in a second part of the heat exchanger to form a second vapor phase and a second liquid phase;
    collecting the first and second liquid phases ; and
    removing the second vapor phase from a top portion of the second part of the heat exchanger.

20. The method of claim 19 further comprising passing a first coolant through channels in the first part of the heat exchanger and passing a second coolant through channels in the second part of the heat exchanger.

* * * * *